United States Patent [19]

Edwards et al.

[11] Patent Number: 4,733,159

[45] Date of Patent: Mar. 22, 1988

[54] CHARGE PUMP VOLTAGE REGULATOR

[75] Inventors: Arthur J. Edwards, Hoffman Estates, Ill.; Mihaly Lamoth, Coppet, Switzerland

[73] Assignee: Motorola, Inc., Schaumburg, Ill.

[21] Appl. No.: 924,100

[22] Filed: Oct. 28, 1986

[51] Int. Cl.[4] .............................................. G05F 1/56
[52] U.S. Cl. ..................................... 323/282; 322/28
[58] Field of Search ................. 323/282, 284; 318/139; 322/28

[56] References Cited

U.S. PATENT DOCUMENTS

| | | | |
|---|---|---|---|
| 3,343,060 | 9/1967 | Ingraham | 323/282 X |
| 3,447,065 | 5/1969 | Kuhn | 322/28 X |
| 4,210,856 | 7/1980 | Taylor | 320/17 |
| 4,346,337 | 8/1982 | Watrous | 322/25 |
| 4,386,310 | 5/1983 | Sievers | 322/28 |
| 4,388,586 | 6/1983 | Lamoth | 323/283 |
| 4,388,587 | 6/1983 | Lamoth et al. | 323/283 |
| 4,580,090 | 4/1986 | Bailey et al. | 323/282 X |
| 4,636,711 | 1/1987 | Freymuth | 318/139 X |

OTHER PUBLICATIONS

Motorola Data Sheets XPC1500 for the 16 Ampere Logic-to-Power Switch.
Motorola Data Sheet MPC1500, Logic-to-Power Switch Block Diagram.

*Primary Examiner*—Patrick R. Salce
*Assistant Examiner*—Marc S. Hoff
*Attorney, Agent, or Firm*—Phillip H. Melamed

[57] ABSTRACT

A voltage regulator (11) provides a pulse width modulated voltage regulator output (40) to a drive circuit (37) to provide field coil excitation for a voltage generator (15-17) providing a charging signal for a battery (14). The voltage regulator output determines on/off states of an FET power switching device (28) coupled in series with a field coil (17) across a maximum power source voltage potential $V_{BAT}$ corresponding to battery voltage. The drive circuit includes a charge pump (26, 35, 36) with a low capacitance capacitor (26) coupled and decoupled across a source of voltage potential at a rate determined by a high frequency signal (41), provided by the regulator, having a frequency substantially in excess of the frequency of the voltage regulator output. The drive circuit includes a pair of switches (21, 35) which alternately couple one terminal of the capacitor to either battery voltage or ground potential in accordance with the voltage regulator output. The above configuration provides a control voltage (44) at the gate of the FET substantially in excess of battery voltage and this insures maximum field current when the FET is on. This is achieved with a minimum capacitance for the capacitor, thus reducing circuit size and cost. Battery current drain of the drive circuit is minimized by disconnecting the one terminal of the capacitor from battery voltage when the FET is off.

18 Claims, 2 Drawing Figures

CHARGE PUMP VOLTAGE REGULATOR

BACKGROUND OF THE INVENTION

The present invention generally relates to the field of voltage regulators, and in particular to voltage regulator systems utilized to control the charging of a battery, such as the battery in a vehicle.

In prior voltage regulator systems for vehicles it is known to provide a voltage regulator which senses battery voltage and provides a pulse width modulated output signal that varies in duty cycle in accordance with the difference between sensed battery voltage and a reference signal. This output signal is used to control a power switching device connected in series with a field coil across the battery voltage potential. The field coil controls excitation of stator windings of a voltage generating system which, after rectification of the output of the stator windings, provides a charging signal for the battery. Such voltage regulator systems, as described above, are conventional and well understood.

In some of the above-noted voltage regulator systems, it is necessary to provide a relatively large voltage, larger than battery voltage, at a control terminal of the power switching device so as to insure that maximum field current is provided when the switching device is on. In some cases an FET (field effect transistor) is utilized as the power switching device, with the drain electrode connected to battery voltage and the source terminal is connected through the field coil to ground potential. In such a configuration, to provide a gate voltage in excess of battery voltage when it is desired to have the FET on, a prior voltage regulator system has utilized a voltage doubler circuit. In the prior voltage doubler circuit, a voltage of approximately twice battery voltage is selectively provided at the gate terminal to insure that approximately the entire battery voltage potential is applied across the field coil when the FET is on.

The voltage doubler circuit of the prior voltage regulator relies on utilizing the pulse width modulated output signal of the voltage regulator to selectively couple and decouple a large magnitude capacitor across the battery voltage potential via a switch device. The end result is that essentially a voltage doubler is provided by the capacitor and the selective switching of the capacitor across the battery voltage potential. However, in such a configuration, a very large capacitance for the capacitor is utilized to insure that at high duty cycle percentages of the voltage regulator output signal, the voltage across the capacitor does not substantially decrease during the long on-duty cycle and thereby decrease the magnitude of the voltage at the gate electrode of the FET. When the prior voltage regulator produced an output signal which essentially resulted in the FET being on all of the time since field coil current was required all of the time, additional complex logic circuitry was required to provide some alternate coupling and decoupling of the capacitor across the battery voltage, and this increased the circuit cost. Without this additional logic circuitry, the twice battery voltage to be maintained at one terminal of the large capacitance capacitor would decrease due to leakage effects and the loading of the turned-on FET device. This is undesirable as it would result in reducing field coil current when the voltage regulator has indicated that maximum field coil current should be provided. Also, the required large magnitude capacitor is expensive, and it cannot be implemented as part of an integrated circuit so as to reduce circuit cost.

SUMMARY OF THE INVENTION

An object of the present invention is to provide an improved voltage regulator which overcomes the aforementioned deficiencies.

A more particular object of the present invention is to provide a voltage regulator which does not require a large magnitude capacitor but which still provides a switching control voltage substantially in excess of battery voltage at the gate of an FET device connected in series with the field coil that controls the output of a voltage generator which implements battery charging.

In one embodiment of the present invention, an improved voltage regulator is provided. The voltage regulator comprises: regulator means for receiving a sensed voltage signal and for providing, in response to the effective comparison of said sensed voltage signal with a reference signal, a regulator output signal, comprising pulses, having a predetermined frequency and a predetermined signal characteristic determined in accordance with said comparison; drive circuit means coupled to said regulator means and comprising a power switching device having a control terminal effectively coupled to said regulator output signal and having at least two output terminals, said output terminals coupled in series with a control element of a voltage control means, which determines said sensed voltage signal, across a maximum power source voltage potential, said drive circuit means controlling said sensed voltage, via said control means, in accordance with said characteristic of said regulator output signal to maintain said sensed voltage signal at a predetermined voltage level determined by said reference signal, said drive circuit means including a peak voltage increasing means for receiving said regulator output signal and effectively providing in response thereto a corresponding increased magnitude voltage signal generally varying as said regulator output signal but varying up to a peak voltage potential in excess of said maximum power source voltage potential, wherein the improvement comprises said peak voltage increasing means comprising a capacitor selectively series coupled and decoupled across a predetermined power source voltage potential in accordance with pulses of a high frequency signal having a pulse frequency substantially in excess of the frequency of said regulator output signal, said peak voltage increasing means, therefore, comprising a high frequency charge pump which provides said increased voltage signal, said increased voltage signal having the same general waveform as said regulator output signal but increased in voltage magnitude to achieve a peak voltage potential in excess of said maximum power source voltage potential, the charge pump providing said increased voltage signal as an output which is coupled to said control terminal of said power switching device.

Essentially, the above-recited configuration results in utilization of a relatively small magnitude capacitor while still providing a switching voltage at the control terminal of the power switching device that is substantially in excess of the maximum power source voltage potential, which preferably corresponds to battery voltage in the vehicle charging system. Preferably, the power switching device comprises an N channel field effect transistor (FET) in which the gate electrode is the control terminal the drain electrode is connected to positive battery voltage and the source electrode is connected through a field coil to ground potential. Preferably, the voltage regulator means output signal comprises a pulse width modulated switching signal which selectively couples one terminal of the capacitor, at which said increased voltage signal is provided, to ground during one polarity of the duty cycle of the regulator output signal and during another polarity of the regulator output signal couples this terminal to battery voltage.

Preferably the high frequency switching signal is at least two orders of magnitude higher than the frequency of the regulator output signal, and this results in requiring only a very small capacitance for the selectively series coupled capacitor thus reducing component cost and size. This also permits synthesizing the capacitor as part of an integrated circuit which includes other regulator components. In addition, the present invention contemplates utilizing the pulse width modulated output signal of the regulator and a switch device to alternately couple and decouple the capacitive terminal at which the increased voltage is produced to battery voltage, and this minimizes battery current drain during duty cycle portions of the regulator output signal during which no field current is desired. Also, this insures no substantial battery current drain when the voltage regulator is off and a low voltage regulator output signal is provided.

BRIEF DESCRIPTION OF THE DRAWINGS

For a more complete understanding of the invention, reference should be made to the drawings, in which.

DESCRIPTION OF THE PREFERRED EMBODIMENT

Figure 1:
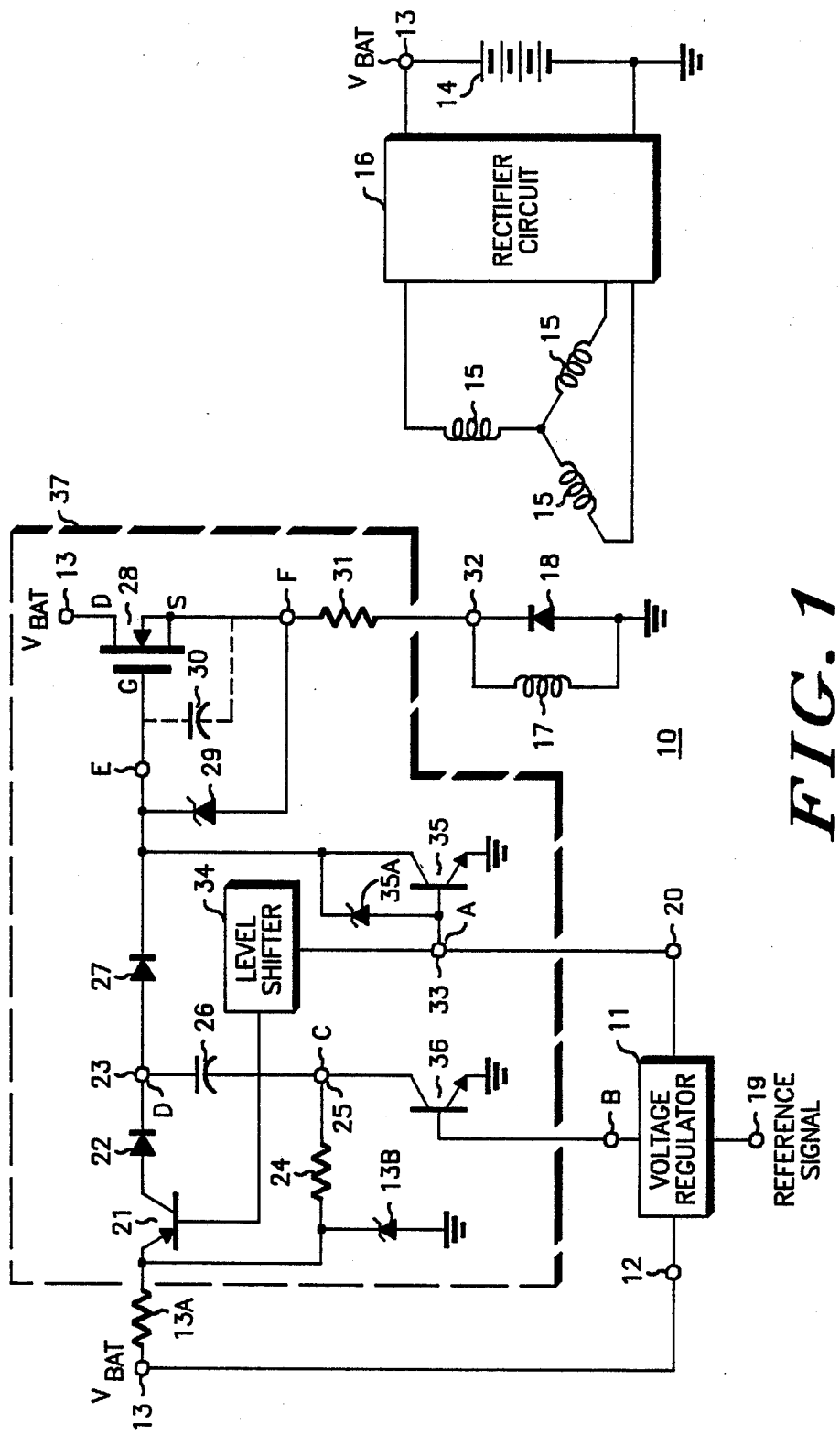
FIG. 1 is a schematic diagram of a voltage regulator system constructed in accordance with the present invention.

Referring to FIG. 1, a voltage regulator system 10 is illustrated in which a substantially conventional pulse width modulated voltage regulator 11 has a voltage sensing input terminal 12 connected to a positive battery voltage terminal 13 also designated as $V_{BAT}$. The terminal 13 corresponds to the positive electrode of a vehicle battery 14 which has its negative electrode connected to ground potential. Charging of the battery 14 is accomplished by means of a plurality of stator output windings 15 which provide an output that is rectified by a rectifier circuit 16. The output of the stator windings 15 is controlled, as is conventionally understood, by the current excitation applied to a field coil 17 having a flyback transient suppression diode 18 connected thereacross.

Essentially, the voltage across the battery is sensed by the voltage regulator 11 via the signal at the terminal 12. The voltage regulator compares this voltage to an internal or external reference voltage signal provided at a terminal 19, and in response to this comparison produces a pulse width modulated regulator output signal at an output terminal 20. The duty cycle of this pulse width modulated output signal at the terminal 20 can vary from approximately 0% to 100% and is essentially determined in accordance with the difference between the sensed battery voltage and the reference signal at the terminal 19. This is accomplished in a conventional manner as is understood to those in the voltage regulator art field, and can be implemented by a number of different circuit configurations for the voltage regulator 11. The constant frequency regulator disclosed in U.S. Pat. No. 4,386,310 to Sievers, assigned to the same assignee as the present invention, can be used for the above described voltage regulator 11. Also see U.S. Pat. Nos. 4,388,586 and 4,388,587. Essentially, the voltage regulator system 10, as is understood, responds to the pulse width modulated switching output signal at the terminal 20 so as to provide field coil current such that the battery voltage at the terminal 13 is maintained at a predetermined voltage with respect to the voltage magnitude of the reference signal at the terminal 19. This operation is conventional.

Essentially, the present invention involves providing a drive circuit means so as to couple the pulse width modulated regulator output signal at the terminal 20 to the field coil 17 so as to control field coil current excitation. This is accomplished in an advantageous manner by a relatively simple and economical drive circuit utilizing inexpensive components. The construction and operation of the drive circuit means is as follows.

The battery voltage terminal 13 is connected through a resistor 13A to the emitter of a PNP first switch device transistor 21 which has its collector coupled through a diode 22 to a terminal 23 also designated as terminal D. The emitter of transistor 21 is coupled to ground through an effective 20 volt Zener diode 13B and coupled through a resistor 24 to a terminal 25 also designated as terminal C. A relatively small magnitude capacitor 26 is connected between the terminals C and D wherein the capacitor 26 has a typical capacitance magnitude of 50 picofarads.

The terminal D is connected through a diode 27 to a gate electrode G of an N channel FET transistor 28 wherein the gate electrode is also designated by the terminal E. A drain electrode D of the FET is directly connected to the battery voltage terminal 13, and a source electrode S of the FET corresponds to a terminal F. A Zener diode 29 is connected between the terminals E and F to insure that no excessive voltage can be applied between the gate and source electrodes which would cause destruction of the FET. In FIG. 1, the effective internal input capacitance of the FET is illustrated as an inherent capacitor 30 connected between the gate and source electrodes and having a typical magnitude of 1000 picofarads. The FET 28 is utilized as a power switching device that controls current in the field coil 17.

The source electrode of the FET is connected through a current sensing resistor 31 to a terminal 32 at which one end of the field coil 17 is connected and a cathode of the flyback diode 18 is connected. Another end of the field coil 17 and the anode of the diode 18 are connected to ground potential. The amount of field coil current being drawn can be measured by noting the voltage drop across the resistor 31, if desired. With this configuration the output electrodes (drain and source) of the FET are connected in series with field coil 17 between a maximum power source potential corresponding to the battery voltage.

The pulse width modulated regulator output signal at the terminal 20 is connected to a terminal 33 also designated as terminal A. This terminal is connected through a level shifter or isolation device 34 to the base electrode of the first switch device transistor 21. The terminal 33 is also connected directly to the base electrode of an NPN transistor 35 which comprises a third switch device transistor having its emitter connected to ground and its collector connected to the terminal E. An effective 40 volt Zener diode 35A is connected between the collector and base electrodes of the transistor 35. A second switch device transistor 36 comprising an NPN transistor has its collector connected to the terminal C, its emitter connected to ground potential and its base electrode connected to a terminal B which is contemplated as being an additional output terminal of the voltage regulator 11 at which a very high frequency switching signal is provided. It is contemplated that the high frequency switching signal at the terminal B is a constant frequency signal having a frequency of 200 to 300 kilohertz, as contrasted with the frequency of the pulse width modulated regulator output signal at the terminal 20 which has an output frequency of 50 to 70 hertz.

The operation of the voltage regulator system 10 in FIG. 1 will now be discussed with reference to the signal waveforms shown in the graphs A through F in FIG. 2. It should be noted that the signal waveforms illustrated in FIG. 2 in graphs A through F correspond to the voltage waveforms of electrical signals provided at the terminals A through F, respectively, in FIG. 1. In the graphs in FIG. 2, the vertical axes are representative of signal magnitude, and the horizontal axes are representative of time. It should also be noted that the time scale utilized to illustrate the very high frequency signal at the terminal B, and its affect on other signals, is not drawn to scale with regard to the much slower varying signal of the pulse width modulated regulator output signal at the terminal 20 corresponding to the signal at terminal A. However, this has been done to enhance the clarity of the Figures as is readily understood.

Figure 2:
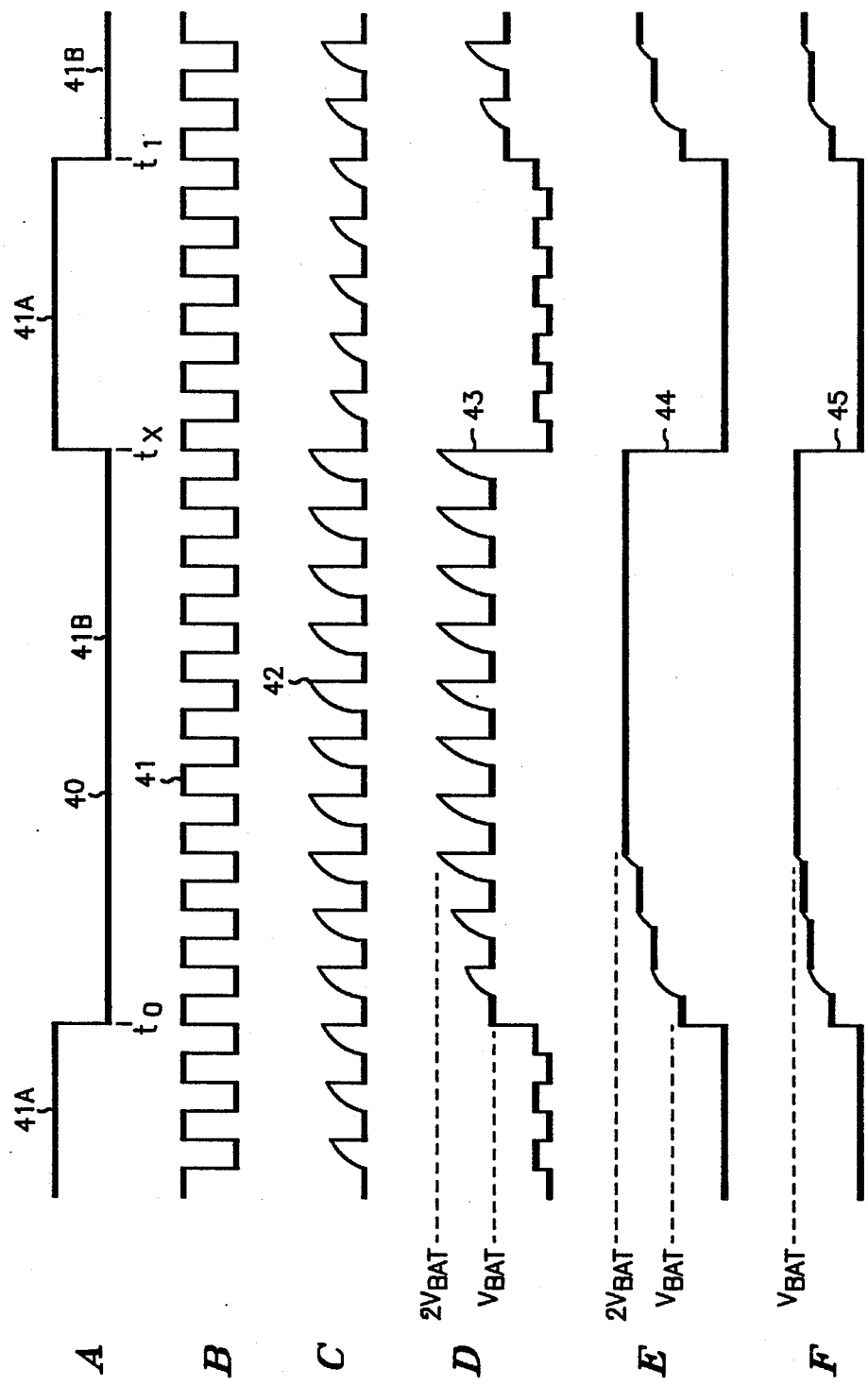
FIG. 2 comprises a series of graphs A through F illustrating waveforms of signals provided at the terminals A through F in FIG. 1.

As shown in FIG. 2, the voltage regulator 11 provides a pulse width modulated signal 40 at the terminal A wherein the duty cycle of this signal is variable and is determined in accordance with the difference between the sensed battery voltage at the terminal 12 and the reference signal voltage at the terminal 19. During a high, or positive, polarity 41A of the duty cycle portion of the signal 40, no field current will be drawn, but during the low, or negative, polarity 41B of the duty cycle of the signal 40, field current will be provided so as to charge the battery 14. The signal 40 illustrates that at a reference time $t_0$, there is a high to low transition indicating the commencement of a low state for the signal 40 during which field current will flow. The frequency of the signal 40 is typically between 50 to 70 hertz, and the duty cycle can vary between extreme percentages such as 0 to 100% depending upon how much field current the voltage regulator 11 determines is necessary.

In generating the pulse width modulated signal 40 at the terminal 20, it is contemplated that the voltage regulator may internally use a very high frequency reference oscillator. Alternatively, a separate high frequency reference oscillator may be provided within the voltage regulator 11 even though this signal may not be utilized to generate the pulse width modulated regulator output signal 20. In either event, the voltage regulator 11 provides at the terminal B a very high frequency signal comprising a series of pulses wherein the frequency is 200 to 300 kilohertz. This is generally shown in graph B in FIG. 2, even though the time scale for graph B does not correspond to the same time scale utilized for graph A.

Essentially, in response to the high and low outputs provided at the terminal 20 by the voltage regulator 11, the first and third switch transistor devices 21 and 35, will be alternately opened and closed. More specifically, in response to a high signal level at the terminal A, transistor 35 will be turned on, therefore grounding the gate electrode of the FET and limiting the voltage at the terminal D to only one diode drop above ground potential. At the same time, this high signal level at the terminal A, via the level shifter 34, will result in effectively turning off the first switch device 21 and thereby decouple the battery voltage terminal 13 from the capacitor terminal D via the transistor 21 and diode 22.

During the time that a high or positive logic level is present at the terminal A, and even when a low logic level is present at the terminal A, a high frequency signal 41 is continuously provided at the terminal B as illustrated in graph B in FIG. 2. The signal 41 is not necessarily continuously provided during the duty cycle polarity 41A of signal 40. This high frequency signal continually results in turning the transistor 36 on and off and, therefore, alternately connecting the terminal C to ground potential and then opening this connection. When a positive signal level is provided at a terminal A, the opening and closing of the transistor switch 36 results in providing a corresponding ramp signal 42 at terminal C as illustrated in graph C in FIG. 2. During the time that the transistor 36 is on, terminal C is connected to ground potential, but when transistor 36 is off, the potential at terminal C rises due to a charging current provided from the battery voltage terminal 13 through the resistor 24. Typically, the peak of this ramp signal during a positive logic state at the terminal A will be approximately 2.5 volts less than the battery voltage at the terminal 13, which is typically 14 volts. Thus, approximately 11.5 volts is the magnitude of the voltage peaks of the signal 42 for a positive logic state at the terminal A which corresponds to no field current being conducted. During this same time, a relatively small magnitude square wave varying at the same frequency as the high frequency signal 41 is at the terminal D wherein the signal at the terminal D is generally designated by the reference numeral 43 in graph D. The peak magnitude of the signal 43 when a positive logic state is at the terminal A is approximately +1 volt since at that time the transistor 35 is on and the peaks of signal at the terminal D are limited by the clipping action provided by the diode 27. Typically, a slight negative voltage is provided at the terminal D when a positive logic state is present at terminal A and the transistor 36 is turned off.

Since a positive logic state at the terminal A turns the transistor 35 on, this means that at this time the gate electrode of the FET is at ground potential, and, therefore, the FET is turned off. While the FET is turned off, field current will not flow in the field coil 17 by virtue of power (current) supplied by the battery 14. A signal 44 in graph E in FIG. 2 illustrates the voltage waveform for the signal at the gate electrode of the FET, and a signal 45 in graph F in FIG. 2 illustrates the voltage waveform at the source electrode of the FET. The signals at the terminals F and 32 are identical, except for a minor voltage shift in case field current is flowing due to the drop across the resistor 31. Thus a graph of the signal at terminal 32 is not provided.

Essentially, prior to the time $t_0$ shown in FIG. 2, there is no field coil current because the FET 28 is turned off. At the time $t_0$, the transistor 35 which was previously on, is now turned off, thus removing the clamping action provided at the gate electrode of the FET by virtue of the transistor 35 and diode 27. At the same time, since a low or negative logic state is now provided at the terminal A, the transistor 21 is turned on via level shifter 34 resulting in applying approximately battery voltage at the terminal D by virtue of the transistor 21 and diode 22. This is illustrated in the graphs in FIG. 2 by the abrupt rising transient present at the time $t_0$ in the signals 43, 44 and 45. Immediately after $t_0$ the signal 43 has a magnitude of $V_{BAT}-1$ diode drop, signal 44 has a magnitude of $V_{BAT}-2$ diode drops, and signal 45 has a magnitude of approximately 7 volts representing the difference between the signal 44 at the terminal E and the gate-to-source turn-on threshold developed across the FET 28.

After the time $t_0$, the transistor 36 continues to be switched on and off at a very rapid rate in accordance with the pulses of the high frequency signal 41. This results in only a slight change in the peak magnitudes of the signal 42 at the terminal C, and this slight increase in magnitude is due to the fact that the clamping action of the diode 27 to ground potential through the transistor 35 has now been removed. However, the significance of continuing the high frequency switching after the time $t_0$ is more evident in the signals 43 through 45. For signal 43, it is noted that what essentially happens is that the ramp signal provided at the terminal C is now effectively transferred to the terminal D and superimposed upon a DC level of approximately the battery voltage $V_{BAT}$ at the terminal 13 minus the series drop across the transistor 21 and diode 22. This essentially results in the signal 43 reaching peak magnitudes of approximately twice the battery voltage since the AC variation of the signal 42 is now effectively superimposed on a DC level of approximately battery voltage.

In response to the signal 43, the diode 27, and the effective input capacitance 30 of the FET effectively provide a peak rectification circuit such that the signal 44 essentially follows the envelope of the signal peaks of the signal 43 less the voltage drop across diode 27. This is illustrated in graph E in FIG. 2. The signal 45 at the source electrode essentially tracks the gate voltage and, therefore, also increases, but the maximum value of the signal 45 is achieved at battery voltage since this signal cannot exceed the drain voltage wherein the drain electrode is directly connected to the relatively constant voltage $V_{BAT}$ at the battery voltage terminal 13. However, as seen in graph F in FIG. 2, the signal 45 does increase from a voltage somewhat below battery voltage to approximately battery voltage during the time that field current is flowing. This means that maximum possible field current is provided during the time that a low logic level is provided for the signal 40 since the source voltage of the FET will now reach approximately battery voltage due to the effective saturation of the FET device 28. This is possible in the present invention since the gate voltage is maintained in excess of the battery voltage $V_{BAT}$ present at the drain electrode and this situation is required in order to maintain the FET in an on condition with the source at $V_{BAT}$. At a subsequent time $t_x$, the signal 40 undergoes a logic state inversion resulting in the turning off of field current, and this is maintained until a subsequent time $t_1$ at which time the turn-on cycle is reinstituted.

Essentially, the present invention is concerned with providing a voltage as high as possible at the terminal F such that maximum field coil current can be drawn when the voltage regulator 11 indicates that field current should be provided. This is accomplished by the present circuit providing approximately battery voltage $V_{BAT}$ at the source electrode of the FET. In order to accomplish this, a much higher than $V_{BAT}$ voltage must be provided at the gate of the N channel FET to insure that the FET turns on and remains on since there is a minimum gate-to-source threshold which must be exceeded in order for the FET to be on. The present invention is concerned with how this larger than battery voltage control signal at the gate of the FET can be produced efficiently and with minimum expense. It should be noted that the reason that the field coil 17 is not provided in the drain circuit of the FET, is that many voltage regulator systems do not wish to subject the field coil to constant positive voltage potential even when no field current is to be drawn. Thus, in the present circuit, the field coil is in the source circuit of the N channel FET, and the FET essentially acts as a source follower. Also, an N channel FET is used since P channel FETs are substantially more expensive.

The present invention essentially provides the approximately twice battery voltage signal at the gate of the FET when it is desired to commence field current. This occurs by use of the high frequency switching provided by the signal 41 at the terminal B and the use of a relatively small magnitude capacitor 26. This is contrasted with prior voltage regulator systems, which while recognizing that a high gate voltage is desirable, implemented this by utilizing relatively slow switching speeds with a very large magnitude capacitor to form a battery voltage doubling system. Those prior systems were not cost effective in implementing field current for 100% of the time, because they required utilization of extensive additional logic circuitry required to provide some periodic interruptions (in case a 100% duty cycle was required) for charging the large capacitor. In addition, the prior systems required an extremely large magnitude capacitor 26 to insure that there was not a substantial decrease in the voltage being maintained at the terminal D after commencement of field current flow. The present invention avoids these problems by implementing very rapid switching via the transistor 36 and, therefore can utilize a very small capacitor (typically 50 picofarads), for the capacitor 26. This enhances circuit performance and reduces circuit cost. In the present circuit, rather than relying on the massive capacitance of the capacitor 26, now the inherent gate-to-source capacitance of the FET 28 can be relied on to maintain an appropriate voltage at the terminal E during field current flow, and thus no additional large capacitor is required. The small size of the capacitor 26 makes it possible to synthesize, on a single integrated circuit chip, substantially all of the components of a driver circuit 37, shown dashed in FIG. 1, and the regulator 11, except the FET 28 and the resistor 31.

In addition to the above advantages, the present invention minimizes battery current drain during a condition of no field current flow. This is because the switch 21 will effectively decouple the capacitor terminal D from battery voltage when no field current is required. If the transistor 21 were replaced by a direct connection between the anode of the diode 22 and the terminal 13, then there would have to be some provision to prevent excessive battery current drain because of the shorting action provided by the transistor 35 and additional leakage current associated with the FET, when this device is off and no field current is drawn. These problems are avoided by utilization of the transistor 21 which is switched alternately with respect to, but at the same frequency as, the transistor 35. Thus transistor 21 prevents series coupling the capacitor 26 between $V_{BAT}$ at terminal 13 and ground during duty cycle portions 41A, and permits such coupling during 41B, and this reduces battery current drain. Also, this insures no substantial battery current drain when the voltage regulator is off, and, therefore, a low voltage regulator output signal at terminal 20 is provided. The effective Zener diode 13B protects the transistors 21 and 36 from excessive battery voltage transients caused by battery load variations, and the effective Zener 35A protects the transistor 35 against transients at the terminal E.

While specific embodiments of the present invention have been shown and described, further modifications and improvements will occur to those skilled in the art. All such modifications which retain the basic underlying principles disclosed and claimed herein are within the scope of this invention.

We claim:

1. A voltage regulator comprising:
   regulator means for receiving a sensed voltage signal and for providing, in response to the effective comparison of said sensed voltage signal with a reference signal, a regulator output signal, comprising pulses, having a predetermined frequency and a predetermined signal characteristic determined in accordance with said comparison;
   drive circuit means coupled to said regulator means and comprising a power switching device having a control terminal effectively coupled to said regulator output signal and having at least two output terminals, said output terminals coupled in series with a control element of a voltage control means which determines said sensed voltage signal, across a maximum power source voltage potential, said drive circuit means controlling said sensed voltage, via said control means, in accordance with said characteristic of said regulator output signal to maintain said sensed voltage signal at a predetermined voltage level determined by said reference signal, said drive circuit means including a peak voltage increasing means for receiving said regulator output signal and effectively providing in response thereto a corresponding increased magnitude voltage signal generally varying as said regulator output signal but varying up to a peak voltage potential in excess of said maximum power source voltage potential,
   wherein the improvement comprises said peak voltage increasing means comprising a capacitor selectively series coupled and decoupled across a predetermined power source voltage potential in accordance with pulses of a high frequency signal having a pulse frequency substantially in excess of the frequency of said regulator output signal, said peak voltage increasing means, therefore, comprising a high frequency charge pump which provides said increased voltage signal, said increased voltage signal having the same general waveform as said regulator output signal but increased in voltage magnitude to achieve a peak voltage potential in excess of said maximum power source voltage potential, the charge pump providing said increased voltage signal as an output which is coupled to said control terminal of said power switching device.

2. A voltage regulator according to claim 1 wherein said predetermined characteristic of said regulator output signal, which characteristic is determined in accordance with said comparison, comprises duty cycle.

3. A voltage regulator according to claim 2 wherein said drive circuit means includes means for selectively preventing said series coupling of said capacitor across said predetermined power source voltage potential during duty cycle portions of said regulator output signal of a predetermined polarity and permitting said series coupling during duty cycle portions of said regulator output signal of an opposite predetermined polarity.

4. A voltage regulator according to claim 3 wherein said predetermined power source voltage potential that said capacitor is selectively series coupled and decoupled across substantially comprises said maximum power source voltage potential that said power switching device and control element of said voltage control means are coupled across.

5. A voltage regulator according to claim 4 wherein the frequency of said high frequency signal pulses is at least one order of magnitude higher than the frequency of said regulator output signal.

6. A voltage regulator according to claim 5 wherein said preventing means of said drive circuit means includes a first switch device which selectively couples a first terminal of said capacitor to a first predetermined voltage in accordance with duty cycle portions of said regulator output signal of a predetermined polarity and decouples said first terminal during duty cycle portions of said regulator output signal of an opposite predetermined polarity, and wherein said peak voltage increasing means of said drive circuit means includes a second switch device which selectively series couples and decouples a second terminal of said capacitor to a second predetermined voltage, different from said first predetermined voltage, in accordance with said pulses of said high frequency signal.

7. A voltage regulator according to claim 6 wherein said drive circuit means includes a third switch device which selectively couples and decouples said one capacitor terminal to said second voltage potential in accordance with said regulator output signal.

8. A voltage regulator according to claim 1 wherein said drive circuit means includes a first switch device which selectively couples a first terminal of said capacitor to a first predetermined voltage in accordance with duty cycle portions of said regulator output signal of a predetermined polarity and decouples said first terminal during duty cycle portions of said regulator output signal of an opposite predetermined polarity, and wherein said peak voltage increasing means of said drive circuit means includes a second switch device which selectively series couples and decouples a second terminal of said capacitor to a second predetermined voltage, different from said first predetermined voltage, in accordance with said pulses of said high frequency signal.

9. A voltage regulator according to claim 8 wherein said drive circuit means includes a third switch device which selectively couples and decouples said one capacitor terminal to said second voltage potential in accordance with said regulator output signal.

10. A voltage regulator according to claim 9 wherein said first capacitor terminal is coupled to said power switching device control terminal through a peak rectifying diode 11. A voltage regulator according to claim 10 wherein said first predetermined voltage is coupled to said first capacitor terminal through a diode.

12. A voltage regulator according to claim 11 wherein said power switching device comprises an FET having gate, drain and source electrodes corresponding to said control and output terminals, respectively.

13. A voltage regulator according to claim 12 wherein said drain electrode is coupled to a source of constant voltage potential and wherein the effective internal capacitance of said FET between said gate and source electrodes is substantially larger than the capacitance of said capacitor.

14. A voltage regulator according to claim 13 wherein said voltage control means comprises a voltage generator means and wherein said control element of said voltage control means comprises a field coil.

15. A voltage regulator according to claim 1 wherein said voltage control means comprises a voltage generator means and wherein said control element of said voltage control means comprises a field coil.

16. A voltage regulator according to claim 15 wherein said voltage generator means includes stator windings, in addition to said field coil, and a rectifier circuit means for receiving the output of said stator windings and providing a charging signal for a battery so as to maintain a predetermined battery voltage thereacross.

17. A voltage regulator according to claim 16 wherein said predetermined voltage across said battery corresponds to said predetermined maximum power source voltage potential.

18. A voltage regulator according to claim 1 wherein the frequency of said high frequency pulses is at least one order of magnitude higher than the frequency of said regulator output signal.

* * * * *

UNITED STATES PATENT AND TRADEMARK OFFICE
CERTIFICATE OF CORRECTION

PATENT NO. : 4,733,159

DATED : March 22, 1988

INVENTOR(S) : Arthur J. Edwards and Mihaly Lamoth

It is certified that error appears in the above-identified patent and that said Letters Patent is hereby corrected as shown below:

In claim 1, Col. 9, line 35, after "voltage control means", please insert --,--.

Signed and Sealed this

Twenty-seventh Day of September, 1988

Attest:

DONALD J. QUIGG

*Attesting Officer*    *Commissioner of Patents and Trademarks*

United States Patent
Edwards et al.

(12) EX PARTE REEXAMINATION CERTIFICATE (6583rd)

(10) Number: US 4,733,159 C1
(45) Certificate Issued: Dec. 30, 2008

(54) CHARGE PUMP VOLTAGE REGULATOR

(75) Inventors: Arthur J. Edwards, Hoffman Estates, IL (US); Mihaly Lamoth, Coppet (CH)

(73) Assignee: CIF Licensing, LLC, Princeton, NJ (US)

Reexamination Request:
No. 90/008,506, Feb. 26, 2007
No. 90/008,955, Dec. 5, 2007

Reexamination Certificate for:
Patent No.: 4,733,159
Issued: Mar. 22, 1988
Appl. No.: 06/924,100
Filed: Oct. 28, 1986

Certificate of Correction issued Sep. 27, 1988.

(51) Int. Cl.
*H02M 3/28* (2006.01)
*H02M 3/24* (2006.01)
*H02J 7/16* (2006.01)
*H02J 7/24* (2006.01)

(52) U.S. Cl. .......................................... 323/282; 322/28
(58) Field of Classification Search .................. None
See application file for complete search history.

(56) References Cited

U.S. PATENT DOCUMENTS

| 4,420,700 A | 12/1983 | Fay et al. ..................... 307/571 |
| 4,603,269 A | 7/1986 | Hochstein .................... 307/571 |
| 4,636,706 A | 1/1987 | Bowman et al. .............. 322/28 |
| 4,736,121 A | 4/1988 | Cini et al. ............. 307/999.999 |

*Primary Examiner*—Minh T Nguyen

(57) ABSTRACT

A voltage regulator (11) provides a pulse width modulated voltage regulator output (40) to a drive circuit (37) to provide field coil excitation for a voltage generator (15–17) providing a charging signal for a battery (14). The voltage regulator output determines on/off states of an FET power switching device (28) coupled in series with a field coil (17) across a maximum power source voltage potential $V_{BAT}$ corresponding to battery voltage. The drive circuit includes a charge pump (26, 35, 36) with a low capacitance capacitor (26) coupled and decoupled across a source of voltage potential at a rate determined by a high frequency signal (41), provided by the regulator, having a frequency substantially in excess of the frequency of the voltage regulator output. The drive circuit includes a pair of switches (21, 35) which alternately couple one terminal of the capacitor to either battery voltage or ground potential in accordance with the voltage regulator output. The above configuration provides a control voltage (44) at the gate of the FET substantially in excess of battery voltage and this insures maximum field current when the FET is on. This is achieved with a minimum capacitance for the capacitor, thus reducing circuit size and cost. Battery current drain of the drive circuit is minimized by disconnecting the one terminal of the capacitor from battery voltage when the FET is off.

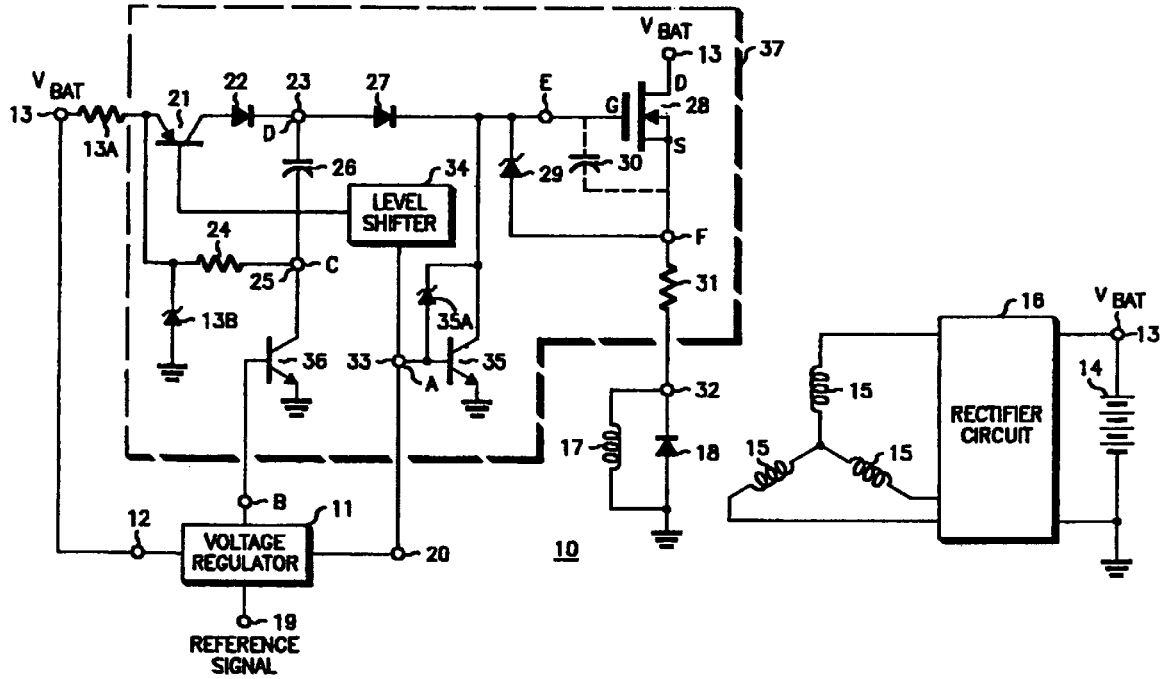

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

* * * * *